No. 623,596. Patented Apr. 25, 1899.
T. C. COVINGTON.
TETHER.
(Application filed Aug. 26, 1898.)
(No Model.)

Witnesses      Thos. C. Covington Inventor
    By his Attorneys,

UNITED STATES PATENT OFFICE.

THOMAS C. COVINGTON, OF DILLON, SOUTH CAROLINA.

TETHER.

SPECIFICATION forming part of Letters Patent No. 623,596, dated April 25, 1899.

Application filed August 26, 1898. Serial No. 689,579. (No model.)

*To all whom it may concern:*

Be it known that I, THOMAS C. COVINGTON, a citizen of the United States, residing at Dillon, in the county of Marion and State of South Carolina, have invented a new and useful Tether, of which the following is a specification.

The invention relates to improvements in tethers.

The object of the present invention is to improve the construction of tethers for securing horses and other stock while grazing and to provide a simple, inexpensive, and efficient one adapted to permit an animal to graze over the desired area without becoming entangled in the anchoring or other devices, thereby effectually preventing any inconvenience, annoyance, and injury to an animal.

A further object of the invention is to provide an efficient tension device which will enable a wire or other line to be stretched taut and maintained in such condition and at the same time permit the wire or line to be readily removed when it is desired to transfer the device to another point for affording an animal fresh pasturage.

The invention consists in the construction and novel combination and arrangement of parts, as hereinafter fully described, illustrated in the accompanying drawings, and pointed out in the claims hereto appended.

Figure 1:
Figures 2, 3, 4:
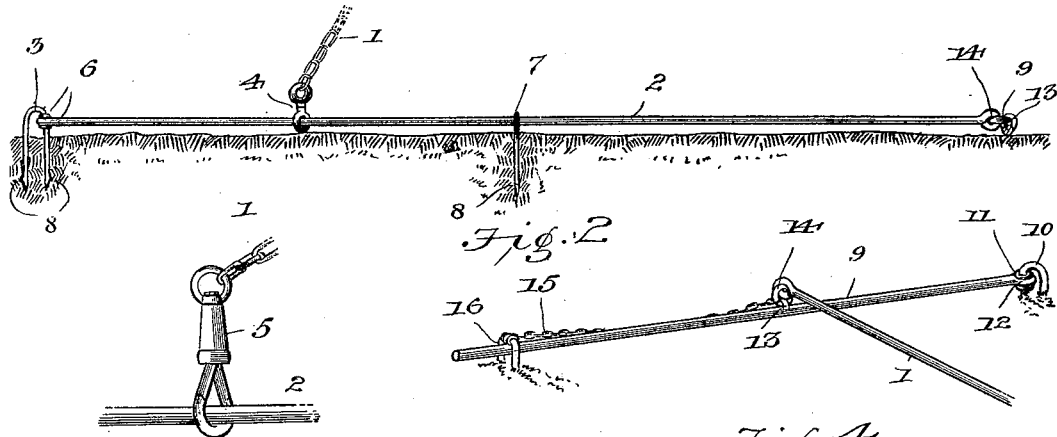

In the drawings, Figure 1 is a perspective view of a tether constructed in accordance with this invention and shown applied to an animal. Fig. 2 is a longitudinal sectional view of the same. Fig. 3 is a detail view of a swivel snap-hook.

Like numerals of reference designate corresponding parts in all the figures of the drawings.

1 designates a tethering-chain which is designed to be connected with a horse, cow, or other animal and which is slidingly connected with a line 2, whereby an animal may graze over a large area. In order to prevent the animal from becoming entangled in the tether, the line 2 is arranged upon the surface of the ground and has one end anchored by means of a staple 3; but a stake or any other suitable anchoring device may be employed for accomplishing this result. The staple, however, has been found preferable, as it will enable a swivel-ring 4 or swivel snap-hook 5 or any other suitable form of slide to move along the line from one end of the same to the other without liability of becoming entangled in it. The top of the staple 3 is arched to enable the tethering-chain or other hitching device to slide over it readily without catching, and it is preferably provided above and below the line 2 with suitable stops 6.

The hitching device, which preferably consists of the tethering-chain 1, may be of any desired construction; but the tethering-chain has been found most convenient and practical, as it possesses a great variety of advantages and is adapted to be connected to a cow by engaging the horns thereof, as illustrated in the accompanying drawings. The tethering-chain, which may be secured around the neck of an animal, is also adapted to be readily shortened to limit the grazing area to which an animal has access, and such grazing area may be further limited by means of an intermediate staple 7. The staples, as illustrated in the drawings, are adapted to be provided with spurs or projections 8, whereby they are securely anchored in the ground and are enabled to withstand all strains incident to their use.

The line 2, which may be constructed of rope or wire, can consist of a chain or cable; but it has been found by experience that wire is the most advantageous, for the reason that it produces the least friction and will not stretch to any material extent after it has been drawn to the proper tension, and when galvanized is not affected by the weather.

In order to enable the line to be drawn to the desired tension, a lever 9 is employed, being fulcrumed at one end on a staple 10 and connected at a point between its ends with the line 2. The staple 10, which is constructed similar to those before described, is provided with stops 11 and passes through a suitable eye 12 of the lever. The lever is provided between its ends with an eye 13, into which is linked an eye or ring 14 of the line 2, and the said eye 13 also serves as the means for connecting a short chain 15 to the lever. One end of the chain is linked into the eye 13, and the other end is connected to a staple 16, which is provided with suitable stops to prevent the short chain from sliding on it. The staple 16, which is carried by or connected with the lever, is adapted to straddle the handle end of the same, as clearly illustrated in Fig. 1 of the accompanying drawings, whereby the lever is secured at the desired adjustment to maintain the line at the proper tension.

The invention has the following advantages: The tether, which is exceedingly simple and inexpensive in construction, possesses great strength and durability, and it is adapted to permit an animal to graze freely without becoming entangled in it, and it will also permit the freedom of an animal to be limited to the desired extent. This is especially advantageous, as it will enable an animal to pasture at certain places within confined areas and will prevent it from injuring plants, trees, shrubbery, fences, and other objects. The device is portable and may be readily removed by dragging it along the ground, and it can be quickly placed in operative position.

Changes in the form, proportion, and minor details of construction, such as varying the character of the line and changing the form of the anchoring devices and also the connection between the tethering-chain and the line—as, for instance, employing a slide or a simple ring instead of the devices shown—may be resorted to without departing from the spirit or sacrificing any of the advantages of this invention.

What I claim is—

1. A device of the class described comprising a line situated in adjacence to the ground, an anchoring device secured at one end to said line and adapted to be sunk into the ground, a horizontal lever connected between its ends to the opposite end of said line and provided at one end with an eye, a staple passing through the eye and sunk into the ground and constituting a fulcrum for the lever, a device separate from said lever and adapted to be sunk into the ground and to also engage the lever for holding the latter in an adjusted position, a slide on said line, and means for connecting an animal with the slide, substantially as described.

2. A device of the class described comprising a line disposed in proximity to the ground and having at one end an eye, an anchoring-staple, the branches of which are sharpened and are adapted to enter into the ground and secured to one end of the line, a horizontal lever disposed in the same plane with said line and having an eye linked in the eye of said line and also having a second eye at one end thereof, a staple passing through the end eye of said lever and having sharpened branches adapted to be sunk into the ground and constituting a fulcrum for the lever, a securing-staple provided with a chain linked into the intermediate eye of the lever and said staple having its branches sharpened to enter the ground and to also straddle the lever near the free end of the latter, a slide on said line, and a hitching device connected with said slide, substantially as described.

In testimony that I claim the foregoing as my own I have hereto affixed my signature in the presence of two witnesses.

T. C. COVINGTON.

Witnesses:
  JOHN H. SIGGERS,
  HAROLD H. SIMMS.